United States Patent [19]

Wilson et al.

[11] Patent Number: 5,428,951
[45] Date of Patent: Jul. 4, 1995

[54] METHOD AND APPARATUS FOR ACTIVE CONTROL OF COMBUSTION DEVICES

[76] Inventors: Kenneth Wilson, 1213 Flora Way; Klaus Schadow, 100 W. Sydnor; Robert Smith, 315 Rancho; Ephraim Gutmark, 602 Rio Bravo, all of Ridgecrest, Calif. 93555

[21] Appl. No.: 106,866
[22] Filed: Aug. 16, 1993
[51] Int. Cl.[6] .................................................. F02C 5/00
[52] U.S. Cl. ................................ 60/39.06; 60/39.76; 60/725; 431/1
[58] Field of Search ............... 60/39.06, 39.76, 39.77, 60/39.78, 39.81, 725; 432/1, 114

[56] References Cited

U.S. PATENT DOCUMENTS

| | | | |
|---|---|---|---|
| 2,847,826 | 8/1958 | Howes | 60/39.826 |
| 3,954,380 | 5/1976 | Valaev et al. | 431/1 |
| 4,583,936 | 4/1986 | Krieger | 431/1 |
| 4,708,635 | 11/1987 | Vishwanath | 60/39.77 |
| 4,947,641 | 8/1990 | Rodgers | 60/39.76 |
| 4,993,938 | 2/1991 | Thrasher et al. | 431/1 |
| 5,145,355 | 9/1992 | Poinsot et al. | 431/114 |

*Primary Examiner*—Louis J. Casaregola
*Attorney, Agent, or Firm*—Melvin J. Sliwka; John L. Forrest, Jr.

[57] ABSTRACT

An improved technique for the active control of various combustion devices. This improved technique employs a flame kernel pulse actuator which produces periodic flame kernels by a spark ignition of a stoichiometric air and fuel mixture upstream of the combustion chamber. The discrete flame kernels are convected in a duct of premixed fuel and air which produce discrete pressure oscillations due to the energy release as each discrete flame propagates. Because the source of the energy release is essentially a chemical reaction, the flame kernel pulse actuator is able to produce a substantial amount of energy release even at the high operating pressures which are often encountered in many operational environments. These pressure oscillations may be adjusted to suppress or augment any combustion induced pressure oscillations as well as act to modulate the mixing layer between the fuel and air, thus controlling the downstream combustion process.

The flame kernel pulse actuator comprises an actuator housing, a secondary fuel injection system, and an igniter. The combination of the igniter and fuel injection system produces a plurality of discrete flame kernels which are convected downstream toward the combustion chamber. The present flame kernel pulse actuator further includes a pressure sensor which is positioned so as to measure the acoustic oscillations in the combustion chamber and a controller device which uses the output of the sensor to control the frequency, phase shift, and amplitude of the discrete flame kernels.

18 Claims, 4 Drawing Sheets

METHOD AND APPARATUS FOR ACTIVE CONTROL OF COMBUSTION DEVICES

BACKGROUND OF THE INVENTION

The present invention generally relates to combustion devices and more particularly to a method and apparatus for the active control of combustion devices. The proper use of the flame kernel pulse actuator, as disclosed herein, is an improvement over conventional active control techniques used for combustion devices.

Many propulsion systems, such as those used in various tactical missile systems, involve an enclosed combustor. The combustion characteristics of an enclosed combustor, including flammability limits, instability, and efficiency are closely related to the interaction between shear flow dynamics of the fuel and air flow at the inlet and acoustic modes of the combustor. Strong interaction, between the acoustic modes of the combustor and the airflow dynamics may lead to highly unstable combustion. Specifically, unstable combustion may occur when the acoustic modes of the combustor match the instability modes of the airflow. For such conditions, the shedding of the airflow vortices upstream of the combustor tends to excite acoustic resonances in the combustion chamber, which subsequently cause the shedding of more coherent energetic vortices at the resonant frequency. The continued presence of such vortices provides a substantial contribution to the instability of the combustion process.

In the past, passive techniques have been used to control the combustion characteristics. Passive control has historically involved modification to the fuel injection distribution pattern and changes to the combustor geometry. For example, in the dump combustor, nonstandard inlet duct cross-sections were used to control the generation and breakdown of large-scale vortices which play a critical role in driving pressure oscillations and determining the flammability limits. Also, passive control of the combustion characteristics has been achieved by utilizing bluff-body flame holders at the downstream facing step into a dump combustor.

In recent years, active combustion control has received increasing attention. In active control, various control devices such as actuators are used to modify the pressure field in the system and modulate the air or fuel supply to suppress combustion induced pressure oscillations. Typically, a feedback control loop is used to drive the devices using the processed output from a sensor which monitors the flame characteristics or pressure oscillations. Different active control schemes have resulted in suppression of pressure oscillations and extension of flammability limits in a laboratory combustor at ambient pressure and with gaseous fuels.

Several different types of active control devices have previously been used in laboratory experiments. These active control devices include: loudspeakers to modify the pressure field of the system or to obtain gaseous fuel flow modulation; pulsed gas jets aligned across a rearward facing step; adjustable inlets for time-variant change of the inlet area of a combustor; and solenoid-type fuel injectors for controlled unsteady addition of secondary fuel into the main combustion zone. These active control devices have proven to be somewhat successful in suppressing pressure oscillations and extending flammability limits when the combustor operates at low heat release rates and at ambient or low pressures.

Active control has been extended to test conditions which approach operational energy and pressure levels. These tests have pointed towards the need for more effective active control devices which can produce high acoustic power at elevated pressures. However, the existing trend in active control techniques for a combustor is towards increasing instability and decreasing performance of the combustor with increasing energy and pressure levels.

Consequently, there exists a need for a reliable and relatively inexpensive device which is capable of actively controlling the stability of combustion devices which enhances the overall combustion performance at both high and low operating pressures

SUMMARY OF THE INVENTION

Accordingly, it is an object of the present invention to provide an improved method and apparatus for actively controlling a combustion process which is effective at both low and high combustion chamber pressures.

It is another object of the present invention to provide an improved apparatus for actively controlling the stability of the combustion process through the generation, propagation, and introduction of discrete pressure oscillations into the combustor.

It is yet another object of the present invention to provide an apparatus for the suppression of combustion induced pressure oscillations which facilitates the modulation of the mixing layer between the fuel and air, thus further controlling the combustion process.

It is yet another object of the present invention to disclose a method for actively controlling the stability of a combustion device through the suppression of combustion induced pressure oscillations. The active control is achieved through the introduction of discrete pressure oscillations which are produced from the energy release from discrete flame kernels.

An important feature of the present invention is that the induced pressure oscillations are produced from the chemical heat release of discrete flame kernels. An actuator located upstream of the combustor generates the discrete flame kernels which are convected toward the combustor by the incoming air velocity.

Yet another feature of the present invention is that either the frequency, phase, or amplitude of the flame kernel pulse actuator's discrete pressure oscillations can be continuously controlled using the processed output of a sensor which measures the resulting acoustic oscillations in the combustor or the flame characteristics of the combustion process.

The present invention is a technique for the active control of various combustion devices. This new technique employs a flame kernel pulse actuator which produces discrete pressure pulses through the generation of periodic flame kernels. The flame kernels are created by the ignition of a secondary fuel and air mixture. These pressure pulses modulate the mixing of the primary fuel and the free stream airflow, thus controlling the combustion process.

The flame kernel pulse actuator comprises an actuator housing which is placed in the transtage duct of a combustion device. The actuator housing has an open aft end which is positioned in a downstream orientation with respect to said combustion device. The flame kernel pulse actuator further comprises a secondary fuel injection system which is adapted for supplying fuel to the actuator and an igniter which is disposed in the actuator housing proximate the fuel injection system. The combination of the igniter and fuel injection system produces a plurality of discrete flame kernels which are convected downstream toward the open aft end of the actuator and released into the airflow.

Having produced the discrete flame kernels within the actuator, the flame kernels propagate in an outward and downstream direction and are subsequently released into the airflow. As the flame kernels propagate toward the combustor, they also release a predetermined quantity of energy into the airflow. This release of energy is dependent on the quantity of fuel injected by the secondary fuel injection system, and the timing and energy input from the igniter. The result is a series of discrete pressure oscillations directed toward the combustion chamber which ultimately affect the stability of the combustion process.

The preferred flame kernel pulse actuator further includes a sensor, preferably a pressure transducer, which is disposed in the combustion chamber. The pressure sensor is positioned so as to measure the acoustic oscillations in the combustion chamber. Also present is a controller device which is adapted for receiving and processing said measurements of the pressure sensor. The controller device further controls the secondary fuel injection system and the igniter so as to actively adjust and control the frequency, phase shift, and amplitude of the discrete flame kernels, preferably in response to the pressure measurements. Alternatively, the frequency, phase, or amplitude of the generated flame kernel and corresponding discrete pressure oscillations can be adjusted or controlled independent of the response of the combustion pressure fluctuations.

In the preferred scenario, the pressure oscillations caused by the energy release of the discrete flame kernels will act to suppress any pressure oscillations induced by the combustion process. The suppression of these combustion induced pressure oscillations which result in the possible extension of flammability limits for a given combustor. Extension of flammability limits has historically represented a significant challenge in the design and development of a high performance combustor. In addition, the active suppression of the combustion induced pressure oscillations through the release of energy by the discrete flame kernels allows for improved mixing of the primary fuel and oxidizer, thus further improving the combustion process.

The disclosed method and apparatus for the active control of a combustion device realizes the aforementioned objects, features and advantages in a manner that is clearly evident from a thorough consideration of the figures and detailed description that follows.

DETAILED DESCRIPTION OF THE INVENTION

The flame kernel pulse actuator was initially developed based on the theory that periodic chemical heat release at a position upstream of the combustor would increase the acoustic power level within the combustion device. If this increased acoustic power level could be accomplished while maintaining amplitude and phase control of the energy source, the resulting pressure oscillations could act to suppress or alternatively to superimpose upon the pressure oscillations caused during the combustion process.

This approach led to the development of the flame kernel pulse actuator which unlike existing active control devices is capable of operating at elevated pressures often encountered in operational environments. The principle of operation is based on convected flame kernels in a duct of premixed fuel and air which produce discrete pressure oscillations due to their energy release. Because the source of the energy release is essentially a chemical reaction, the flame kernel pulse actuator is able to produce the required energy release even at high operating pressures. This feature is an improvement over devices that produce mechanically induced or acoustic oscillations which are practical only when utilized at ambient or low operating pressures.

Initially, the frequency of the flame kernels was regulated in such a manner as to counteract and suppress the pressure oscillations induced by the combustion process. It is quite apparent, however, that either the frequency, phase, amplitude of the generated flame kernel and corresponding energy release pattern produced by the pulse actuator, or any combination thereof, can be adjusted to yield discrete pressure oscillations which effectively counter or suppress the pressure oscillations present in the combustor. The aforementioned parameters can be continuously and actively controlled in response to the processed output of a sensor which measures the resulting acoustic oscillations in the combustor or the flame characteristics of the combustion process.

Specifically, the aforementioned parameters can be controlled or adjusted independently form one another or collectively with the use of a control device such as an $H_\infty$ (H-infinity) controller. Any adjustment of the phase of the flame kernel is clearly with respect to the phase of an external signal, preferably the combustion signal. On the other hand, the amplitude of the flame kernel is directly proportional to the type and quantity of the fuel present in the actuator housing and the energy imparted to the actuator by means of the igniter. Preferably, the energy imparted to the actuator can be controlled by varying the duty cycle of the input signal to the preferred igniter. Likewise, the frequency of the flame kernel is dependent on the frequency of the ignition which can be controlled as described above.

It is important, however, to recognize that other system variables may affect the results obtained with the flame kernel pulse actuator. These variables include, but are not limited to, the flame speed of the kernels, the airflow velocity of the convected flame kernels, the dimensions of the actuator housing, the type of fuel used, the fuel content within the actuator, and the energy input attributable to the means of ignition. The flame speed of the kernel is the rate at which the kernel grows in a radially outward direction. The convection velocity is the velocity of the airflow which transports or causes the downstream movement of the flame kernel. To avoid merging of the flame kernels, the flame speed is smaller than the airflow velocity that is convecting the flame kernels. It is also important for the flame kernel to avoid impinging on the actuator housing, which could also result in the merging of the kernels.

Figure 1:
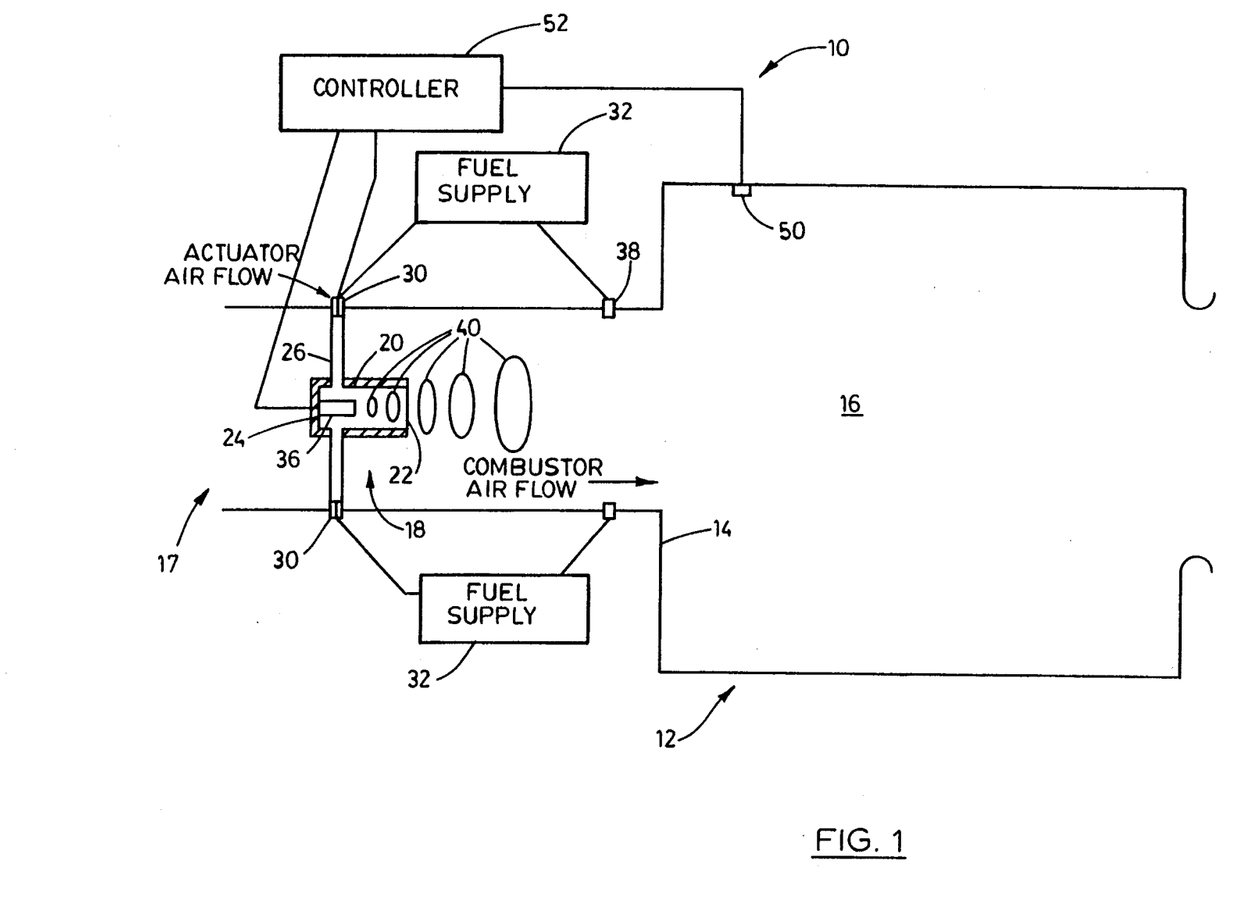
FIG. 1 is a schematic view of the flame kernel pulse actuator system situated in a typical combustion device.
Figure 2:
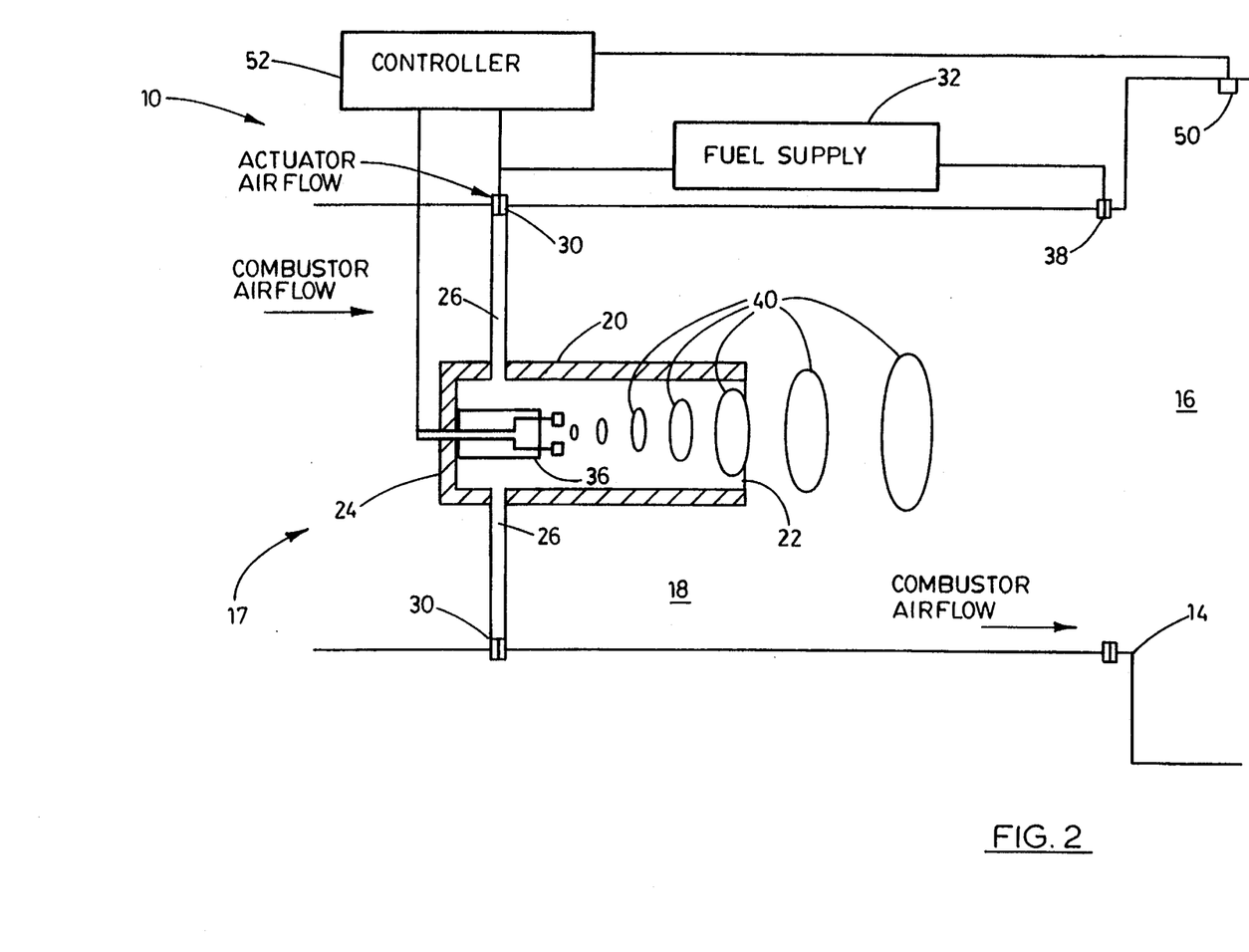
FIG. 2 is a cross section view of the actuator housing illustrating the auxiliary fuel injection system, the igniter, and the propagation of the discrete flame kernels in an outward direction and toward the combustion chamber.

Referring now to the drawings, and particularly to FIG. 1 and FIG. 2, there is shown a general illustration of the present invention disposed within a combustion device and a detailed diagram of the preferred embodiment of the flame kernel pulse actuator being generally designated by the numeral 10. As seen in FIG. 1, the flame kernel pulse actuator system (10) is applied to an enclosed combustion device (12), preferably a dump combustor. The flame kernel pulse actuator system (10) is shown in relation to the dump station (14) and combustion chamber (16). The present invention can easily be applied to other types of combustion devices (12) including a premixed combustor, a ramjet combustor, and the like. Furthermore the exact location of the flame kernel pulse actuator system (10) depends on the combustor geometry and other operating characteristics.

The flame kernel pulse actuator system (10) comprises an actuator housing (20) which is preferably laced in the inlet or transtage duct (18) of a combustion device (12). The actuator housing (20) has an open aft end (22) which is preferably positioned in a downstream orientation with respect to the airflow in the combustion device (12). As stated above, the open aft end (22) of the actuator housing (20) is preferably placed at least three inches from the dump station and placed in a centrally and axial orientation. In the preferred embodiment of the flame kernel pulse actuator system (10), the actuator housing (20) is a $\frac{3}{4}$ inch cylindrical tube with an open aft end (22). The actuator housing (20) further has an inlet (26) proximate the forward end (24) where a mixture of fuel and air enters the actuator housing (20).

The flame kernel pulse actuator system (10) further comprises an auxiliary fuel injection system (30) which is adapted for supplying an air and fuel mixture to the flame kernel pulse actuator housing (20). The auxiliary fuel injection system (30) is preferably adapted to produce a stoichiometric air and fuel mixture which is introduced to the actuator housing (20) via the inlet (26) which is near the forward end (24) of the actuator housing (20). The fuel supplied to the flame kernel pulse actuator housing (20) is typically from the same fuel supply (32) as that of the primary fuel injection system (38) for the combustion device (12). The quantity of fuel supplied to the flame kernel, pulse actuator housing (20) is normally represented as a percentage of the total fuel supplied to the system. The actual amount of fuel supplied to the actuator housing (20) will vary depending upon the external conditions, such as operating pressure, airflow rate and combustor geometry, as well as the desired energy release of each discrete flame kernel (40). The preferred fuel ratios or percentages for the flame kernel pulse actuator system (10) is within the range of approximately 2 percent for high pressure conditions to approximately 20 percent for low pressure conditions. As stated previously, the exact specification of such design details such as the fuel ratios will depend on the combustor configuration and operating environments.

The flame kernel pulse actuator system further comprises an igniter (36) which is centrally disposed in the cylinder proximate the auxiliary fuel injection system (30). The preferred igniter (36) is a spark igniter capable of producing about 70 watts of energy at a predetermined frequency which preferably ranges from about 50 Hz to over 1 kHz. It is foreseeable to use other types of ignition including an igniter employing a laser means. The combination of the igniter (36) and auxiliary fuel injection system (30) produces a plurality of discrete flame kernels (40) inside the actuator housing (20) which are then convected downstream toward the open aft end (22) of the actuator housing (20) and released into the airflow.

The discrete flame kernels (40) propagate in a downstream direction and are released into the transtage duct (18). As the flame kernels propagate toward the combustion chamber (16), they also release a predetermined quantity of energy into the airflow. This release of energy is dependent on the quantity of fuel injected by the auxiliary fuel injection system (30), and the frequency and energy input from the igniter (36). The result is a series of discrete pressure oscillations directed toward the combustion chamber (16) which ultimately affect the mixing of the primary air and fuel mixture at the dump station (14) and the overall stability of the combustion process.

The present flame kernel pulse actuator system (10) further includes a sensor (50), preferably a pressure transducer, which is disposed in the combustion chamber (16). The pressure sensor (50) is positioned about one inch downstream of the dump station (14) so as to measure the acoustic oscillations in the combustion chamber (16). The pressure measurements of the sensor (50) are then fed into a controller device (52) which is adapted for receiving and processing this information. The controller device (52) is further connected to the secondary fuel injection system (30) and the spark igniter (36) and thus monitors the operating characteristics of the flame kernel pulse actuator system (10). The controller device (52) utilizes these input values to actively control the frequency, phase shift, and amplitude of the discrete flame kernels (40) in response to the aforementioned information.

The flame kernel pulse actuator system (10) is capable of controlling the combustion in two varying modes of operation. In an open loop mode, the frequency, phase, or amplitude of the generated flame kernel and corresponding discrete pressure oscillations are controlled independent of the response of the combustion pressure fluctuations. Alternatively, in the closed loop mode, the pressure fluctuation signal is continually combined with functions of the actuator control signal for comparison to reference values to achieve a desired form of regulation and to maintain prescribed relationships between the actuator commands and stability of the combustion process. As disclosed previously, the controller device (52)is employed so as to actively adjust and control the frequency, phase shift, and amplitude of the discrete flame kernels (40) in response to the pressure measurements.

As stated previously, the flame kernel pulse actuator system is not only capable of suppressing the pressure oscillations but can also be adjusted so as to enhance the instability of the combustion process for devices such as incinerators where the instability provides certain advantages.

The use of the flame kernel pulse actuator system is but an example of the improved method for actively controlling the stability of a combustion device. The preferred method of actively controlling the stability of a combustion device would involve the following procedure:

(a) Producing a series of discrete flame kernels (40) upstream of the combustion chamber (16) preferably in the transtage duct (18) or inlet duct (17) of a given combustion device. These discrete flame kernels (40) are then convected toward the combustion chamber (16). The means for producing the flame kernels should be a sufficient distance upstream of a combustion chamber so as to facilitate modulation of mixing layers between the fuel and air.

(b) As the discrete flame kernels (40) are moving downstream, the flame kernel continues to grow which simultaneously releases a predetermined quantity of chemical heat or energy into duct upstream of the combustion chamber. This periodic chemical heat release produces discrete pressure oscillations in the duct which also propagate toward the combustion chamber. These discrete pressure oscillations affect the mixing of the primary air and fuel supply which clearly affects the stability of said combustion device;

(c) The growth of the discrete flame kernels (40) should preferably occur at a flame speed which is less than the velocity of the airflow that is convecting said flame kernels;

(d) Measuring any resulting acoustic oscillations in said combustor chamber (16) with the use of a sensor (50), preferably a high frequency response pressure transducer which is located about one inch into the combustion chamber (16); and (e) Processing the measurements of the pressure sensor (50) with the aid of a controller device (52). This controller device (52) is preferably adapted for receiving and processing the measurements. The controller device (52) is also preferably connected to the means for generating the flame kernels so that it is possible to actively control and adjust the frequency, phase shift, and amplitude of said flame kernels, in response to the resulting acoustic oscillations.

As applied to the flame kernel pulse actuator or similar actuating device, this method would first involve the procedure which involves the steps of:

(a1) placing an actuator housing within an inlet duct of the combustion device, (a2) connecting an auxiliary fuel injection means to the actuator housing. This auxiliary fuel injection means is preferably adapted to provide structural support for housing as well as supplying the fuel and air mixture to the actuator housing; and (a3) placing a spark igniter in the actuator housing which in conjunction with said fuel injection means produces a plurality of discrete flame kernels which are convected toward the combustion chamber. As the flame kernels are moving downstream, they release a predetermined quantity of chemical heat or energy into duct upstream of the combustion chamber. This periodic chemical heat release produces discrete pressure oscillations in the duct which also propagate toward the combustion chamber.

EXAMPLES

Several tests were conducted to demonstrate the feasibility of using the method and apparatus for actively controlling the combustion. These tests utilized a dump combustor with a 2.5 inch diameter air inlet pipe leading into a combustion chamber of 5.3 inches in diameter. Different test set-ups were used to conduct the tests so as to simulate a low pressure operating mode and a high pressure operating mode. For the low pressure operating mode the combustion chamber was 19.5 inches in length with an exhaust nozzle of 3.5 inches in diameter. Conversely, for the high pressure operating mode the combustion chamber was 15.0 inches in length with an exhaust nozzle of 2.2 inches in diameter. The pertinent parameters of the two configurations are summarized below.

| Parameter | Low Pressure Configuration | High Pressure Configuration |
|---|---|---|
| Air mass flow rate | 0.16 lb/sec | 0.92 lb/sec |
| Equivalence ratio | 0.2 | 0.45 |
| Chamber pressure, $P_c$ | 14 psia | 26 psia |
| Energy release | 75 kW | 1 MW |
| Instability frequency, | 200 Hz | 140 Hz |
| Amplitude of pressure fluctuations | 0.10 $P_c$ | 0.23 $P_c$ |

A flame kernel pulse actuator was mounted in the inlet pipe at various distances from the dump station. The actuator consists of a ¾ inch tube with a spark igniter centered on its axis of symmetry. A stoichiometric mixture of ethylene and air enters the pipe at its upstream inlet and is ignited periodically by the spark at a predetermined frequency, in the range of approximately 50 Hz to over 1 kHz. Discrete flame kernels are produced by the ignition of the flame kernel pulse actuator. These discrete flame kernels are convected downstream inside the pipe while the flame front propagates. Each discrete flame kernel produces pressure oscillations due to their periodic energy release. These pressure oscillations are used to modulate the separating mixing layer at the dump plane.

In the low pressure configuration, approximately 20% of the ethylene was injected upstream into the actuator, while 80% was injected near the dump station; while in high pressure configuration, only 2% was injected into the actuator. The equivalence ratio of the fuel and air mixture in the combustor, the air flow rate, and the combustor geometry were initially adjusted to obtain an unstable combustion. The pressure oscillations inside the combustion chamber were monitored by a high frequency response pressure transducer mounted approximately one inch downstream of the dump plane.

High Pressure Combustion Instability Control

Figure 3:
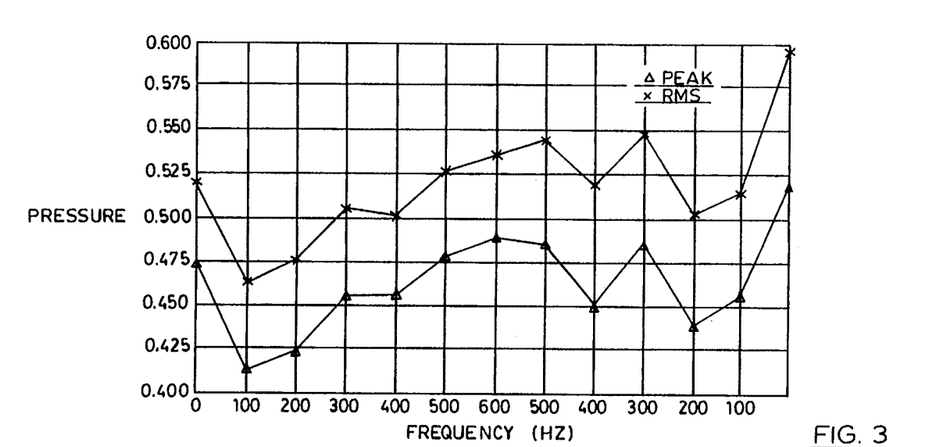
FIG. 3 depicts the test results obtained with the flame kernel pulse actuator as it was used to demonstrate the capability of suppressing combustion induced oscillations in a high pressure environment. The graph charts the variation of the total pressure RMS and peak pressure instability level at different frequencies. The flame kernel pulse actuator was located approximately four inches upstream of the combustor dump station and was utilizing an open-loop control mode.

FIG. 3 depicts the test results obtained with the flame kernel pulse actuator in a high pressure environment when an open loop control mode was used to suppress the oscillations. The combustor was operating at an unstable frequency of 140 Hz. The largest suppression of 1.26 dB was actually obtained when the actuator was operating between 100 Hz and 200 Hz. When the actuator was operating at some higher frequencies (f>500 Hz), the combustion was destabilized. The optimal distance of the actuator from the dump plane was determined to be approximately four inches. In the high pressure combustor, the location of the actuator was found be very critical.

Figure 4:
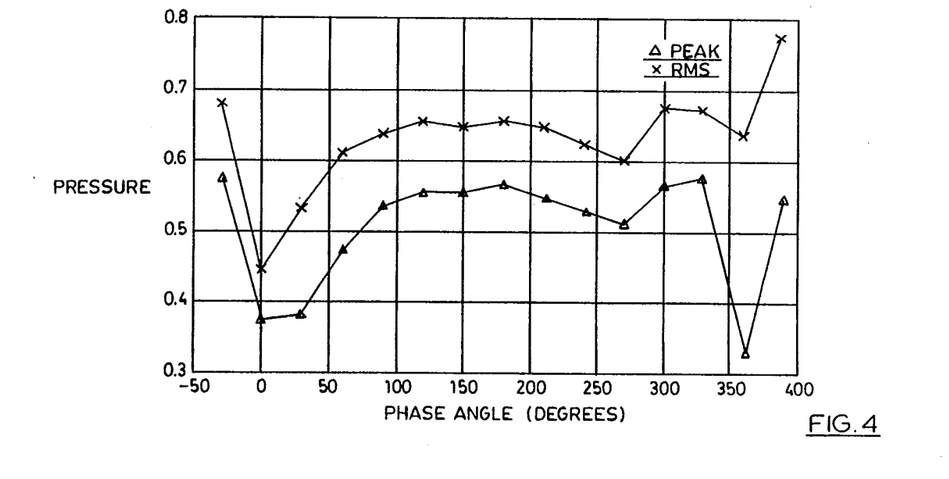
FIG. 4 depicts the test results obtained with the flame kernel pulse actuator as it was further used to demonstrate the capability of suppressing combustion induced oscillations in a high pressure environment. The graph charts the variation of the total pressure RMS and peak pressure instability level at different phase angle shifts. The flame kernel pulse actuator was located approximately five and one-half inches upstream of the combustor dump station and operating at a frequency of 140 Hz in a closed-loop control mode.

FIG. 4 depicts the test results obtained with the flame kernel pulse actuator in a high pressure environment when an closed loop control mode was used to suppress the oscillations. The flame kernel pulse actuator was operating at 140 Hz which is approximately equal to the unstable frequency of the combustor. The phase angle of the actuator signal was varied between 0° and 360°. This high pressure, closed-loop configuration realized a 5.0 dB reduction in the peak pressure level at the instability frequency of 140 Hz at 0° phase angle.

Low Pressure Combustion Instability Control

Figure 5:
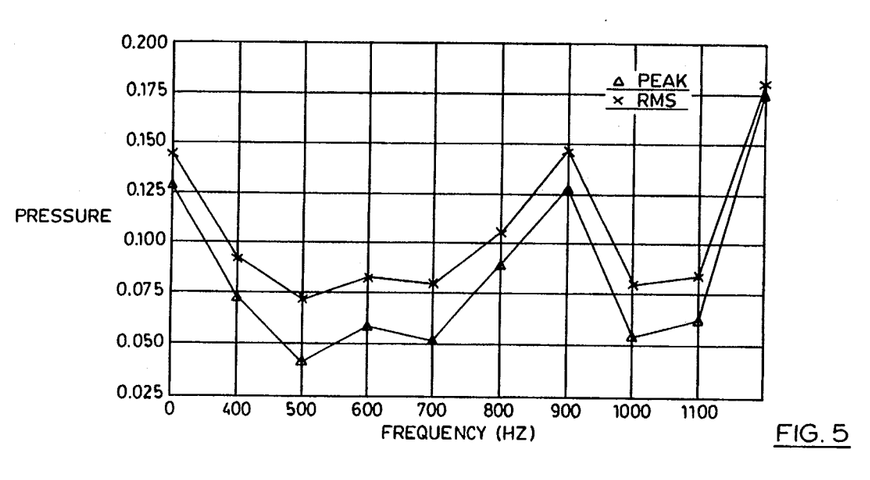
FIG. 5 depicts the test results obtained with the flame kernel pulse actuator as it was used to demonstrate the capability to suppress combustion induced oscillations in a low pressure environment. The graph charts the variation of the total pressure RMS and peak pressure instability level at different frequencies. The flame kernel pulse actuator was located approximately three inches upstream of the combustor dump station and was utilizing an open-loop control mode.

FIG. 5 provides the test results obtained when the actuator was operated in an open-loop mode in a frequency range of 100 to 1100 Hz. The pulse actuator was placed at a distance of approximately three inches from the dump plane. The highest suppression was obtained at a frequency of 500 Hz when the amplitude of the initial instability level was reduced by nearly 12 dB. The total RMS of the pressure fluctuation was reduced at the same frequency by 7.4 dB; The efficiency of the actuator deteriorated at frequencies above 500 Hz and a 40% increase in the supply voltage to the spark was necessary to extend the operating range to 1100 Hz.

Figure 6:
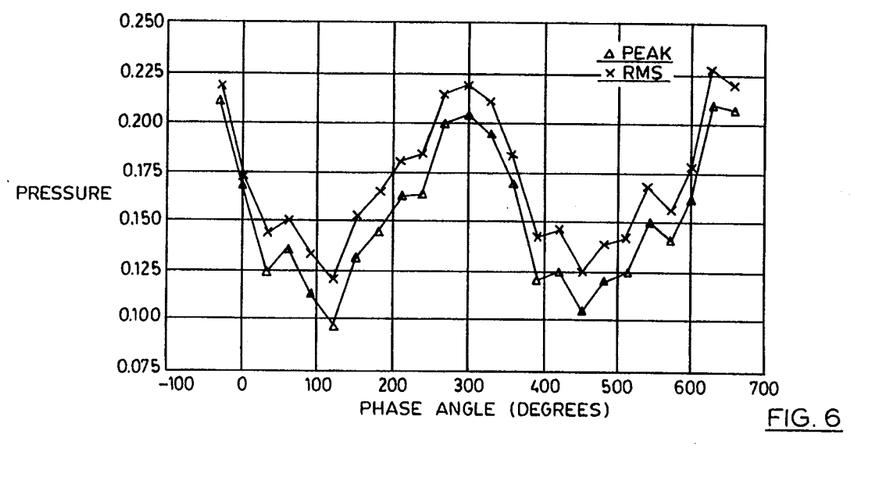
FIG. 6 depicts the test results obtained with the flame kernel pulse actuator as it was further used to demonstrate the capability to suppress combustion induced oscillations in a low pressure environment. The graph charts the variation of the total pressure RMS and peak pressure instability level at different phase angle shifts. The flame kernel pulse actuator was located approximately three inches upstream of the combustor dump station and operating at a frequency of 200 Hz in a closed-loop control mode.

FIG. 6 provides the test results obtained when the flame kernel pulse actuator was operated in an closed-loop active control system at the low operating pressures. The change in the total RMS level and the peak instability level are depicted as a function of the phase shift between the pressure fluctuations and the actuator signal over nearly two period (0° to 630°). The maximum suppression of 7.0 dB was obtained for a phase lo angle of 120°. Unlike the behavior of combustion controllers with acoustic actuators, there is no range of phase angles at which the combustion is destabilized relative to the uncontrolled case. At 300° the instability level goes back to nearly the uncontrolled one.

Test Results and Observations

The following paragraphs summarize the test results obtained when the preferred method and apparatus for active control of a combustion device, namely the flame kernel pulse actuator, was used in both high pressure operating conditions and low pressure operating conditions. The tests described above and summarized herein were conducted with the flame kernel pulse actuator in conjunction with either an open loop control system or a closed loop control system.

For low pressure conditions, the open-loop controller resulted in suppression of 12.0 dB in the peak pressure level at the instability frequency of 200 Hz. Use of the closed-loop controller resulted in suppression of 7.0 dB in the peak pressure level at the instability frequency of 200 Hz and at 120° phase shift.

For high pressure operation conditions, the open-loop controller yielded a maximum suppression of 1.3 dB in the peak pressure level at the instability frequency while the closed-loop controller realized a 5.0 dB reduction in the peak pressure level at the instability frequency of 140 Hz at 0° phase angle.

As is commonly known to those persons skilled in the art, a decibel (dB) is a unit of measurement used to express the magnitude of a change in a given signal. The difference in decibels between two signals is 20 times the common logarithm of their ratio of measured voltages.

The suppression obtained at high pressure was effective at a wide range of equivalence ratios; while at the low pressure operation, suppression was observed only at a narrow range of equivalence ratios preferably near the design conditions. At most other equivalence ratios during low pressure operation, destabilization of the combustion process was observed.

The highest effectiveness was observed when the flame kernel pulse actuator was at least three inches upstream of the dump plane, indicating that the major effect of the flame kernel pulse actuator is to modulate the mixing layer rather than to modify directly the heat release pattern.

While the aforementioned tests utilized a specific and preferred embodiment of the method and apparatus for active control of a combustion device, many other configurations are permissible. For example, the flame kernel pulse actuator could be used with a premixed combustor with a flameholder instead of a dump combustor. Also, the flame kernel pulse actuator can be tailored for use with many different fuels. The exact configuration of the flame kernel pulse actuator would of course depend on the flame speed of the kernels, the convection velocity of the kernels, and the type of fuel used to mention a few of the variables involved. Another example would be to incorporate the active control techniques disclosed herein with conventional passive control techniques for combustion devices. Some of these passive control techniques include improved fuel injection techniques and changes to the combustor geometry. It is also possible to alter the shape, number, orientation and location of flame kernel pulse actuators to achieve an optimum energy release pattern for a given operational environment and combustor geometry.

From the forgoing description, those skilled in the art will appreciate that all the objects and features of the present invention are realized. A method and apparatus has been shown and described for providing active control of a combustion device. While a specific embodiment has been shown and described, many variations are possible. Those persons skilled in the art will appreciate that certain modifications may be made to the invention without departing from its spirit, therefor it is not intended that the scope of the invention be limited to the specific embodiment illustrated and described. Rather, it is intended that the scope of this invention be determined by the appending claims and their equivalents.

What is claimed as the invention is:

1. A flame kernel pulse actuator for actively controlling the stability of an operating combustion device, said combustion device having an inlet duct, a combustion chamber, a primary fuel injection means, a fuel and air mixture, and an ignition means, said flame kernel pulse actuator comprising:
   an actuator housing adapted for attachment within said inlet duct of said combustion device, said housing defining an open aft end facing in a downstream orientation with respect to said combustion device;
   an auxiliary fuel injection means adapted for supplying an auxiliary fuel and air mixture within said actuator housing, said auxiliary fuel and air mixture supplied by said auxiliary fuel injection means being separate from the fuel and air mixture required for the operation of the combustion device;
   an igniter disposed in said actuator housing which in conjunction with said auxiliary fuel injection means produces a plurality of discrete flame kernels which are convected toward said open aft end of said actuator housing and released into said inlet duct, said discrete flame kernels further releasing a predetermined quantity of energy into said inlet duct and upstream of said combustion chamber, thereby producing discrete pressure oscillations in said inlet duct which propagate towards the combustion chamber; and
   a controlling means for actively controlling the frequency, phase shift, and amplitude of the discrete flame kernels in said inlet duct which affects the frequency, phase shift, and amplitude of said discrete pressure oscillations which in turn affects the stability of said operating combustion device.

2. The flame kernel pulse actuator of claim 1 wherein said controlling means is an open-loop controlling means further comprising a controller device operatively connected with said auxiliary fuel injection means and said igniter so as to actively control one or more of the parameters consisting of frequency, phase shift, and amplitude of the discrete flame kernels.

3. The flame kernel pulse actuator of claim 1 wherein said controlling means is a closed-loop controlling means further comprising:
   a sensor disposed in said combustion device, said sensor adapted for measuring any acoustic oscillations in said combustion device; and
   a controller device adapted for receiving and processing any measured acoustic oscillations from said sensor, said controller device further operatively connected with said auxiliary fuel injection means and said igniter so as to actively control one or more of the parameters consisting of frequency, phase shift, and amplitude of the discrete flame kernels in response to measured acoustic oscillations.

4. The flame kernel pulse actuator of claim 3 wherein said controller device further controls the flame speed of said plurality of flame kernels such that said flame speed is smaller than said auxiliary air and fuel mixture velocity that is convecting said flame kernels.

5. The flame kernel pulse actuator of claim 3 wherein said controller device further controls the auxiliary air and fuel mixture velocity that is convecting said flame kernels such that said flame kernels avoid merging with other flame kernels within said actuator housing.

6. The flame kernel pulse actuator of claim 3 wherein said controller device further controls the fuel content of said auxiliary fuel and air mixture supplied by said auxiliary fuel injection means.

7. The flame kernel pulse actuator of claim 3 wherein said sensor is a high frequency response pressure transducer adapted to measure acoustic oscillations in said combustion device.

8. The flame kernel pulse actuator of claim 1 wherein said actuator housing is located in said inlet duct and a sufficient distance upstream of said combustion chamber so as to facilitate modulation of mixing layers between the fuel and air mixture used in said operating combustion device.

9. The flame kernel pulse actuator of claim 8 wherein said actuator housing is a cylindrical tube defining an open aft end and an inlet proximate a forward end, said cylindrical tube being centrally and axially oriented in said inlet duct of said combustion device.

10. The flame kernel pulse actuator of claim 1 wherein said auxiliary fuel injection means is adapted for supplying said auxiliary air and fuel mixture into said actuator housing via a fuel/air inlet proximate a forward end of said actuator housing.

11. The flame kernel pulse actuator of claim 1 wherein said igniter is a spark igniter.

12. A method for actively controlling the stability of a combustion device, said combustion device having an inlet duct, a combustion chamber, a primary fuel injection means, a fuel and air mixture, and an ignition means, said method comprising the steps of:
   installing a flame kernel actuating device proximate said inlet duct of said combustion device, said flame kernel actuating device capable of producing a plurality of discrete flame kernels;
   producing a series of discrete flame kernels in said inlet duct of said combustion device which are convected toward a combustion chamber of said combustion device, said discrete flame kernels further releasing a predetermined quantity of energy into said inlet duct thereby producing discrete pressure oscillations which affect the stability of said combustion device;
   taking measurements of any resulting acoustic oscillations in said combustion device with the use of a sensor, said sensor disposed in said combustion device;
   processing said measurements of said sensor with a controller device which is adapted for receiving said measurements, said controller device further operatively connected with said flame kernel actuating device so as to actively control frequency of said flame kernels, phase shift of said flame kernel, and amplitude of said flame kernels, in response to said sensor measurements; and
   adjusting one or more of the parameters consisting of the group; frequency of said flame kernels, phase shift of the flame kernels, and the amplitude of the flame kernels, to achieve a desired form of regulation of said combustion device.

13. The method for actively controlling the stability of a combustion device of claim 12 wherein said step of installing said flame kernel actuator device further comprises the steps of:
   placing an actuator housing within an inlet duct of said combustion device, said actuator housing defining an open aft end facing in a downstream orientation with respect to said combustion device;

connecting an auxiliary fuel injection means to said actuator housing, said auxiliary fuel injection means adapted for supplying an auxiliary fuel and air mixture within said actuator housing, said auxiliary fuel and air mixture supplied by said auxiliary fuel injection means being separate from the fuel and air mixture required for the operation of the combustion device; and placing an igniter in said actuator housing which in conjunction with said fuel injection means produces a plurality of discrete flame kernels which are convected toward said open aft end of said actuator housing and released into said inlet duct, said discrete flame kernels further releasing a predetermined quantity of energy into said inlet duct thereby producing discrete pressure oscillations which affect the stability of said combustion process.

14. The method for actively controlling the stability of a combustion device of claim 13 wherein said step of placing an actuator housing within said inlet duct of said combustion device further includes placing said actuator housing a sufficient distance upstream of a combustion chamber so as to facilitate modulation of mixing layers between the fuel and air.

15. The method of claim 14 wherein said step of placing an actuator housing within said inlet duct of said combustion device further includes placing said actuator housing at least three inches upstream of the combustor chamber.

16. The method for actively controlling the stability of a combustion device of claim 12 wherein said sensor is a high frequency response pressure transducer adapted to measure acoustic oscillations in said combustion device.

17. The method for actively controlling the stability of a combustion device of claim 13 further comprising the step of connecting said controller device to said auxiliary fuel injection means and said igniter such that said controller device further controls the flame speed of said plurality of flame kernels such that said flame speed is smaller than said auxiliary air and fuel mixture velocity that is convecting said flame kernels.

18. The method for actively controlling the stability of a combustion device of claim 13 further comprising the step of connecting said controller device to said auxiliary fuel injection means and said igniter such that said controller device further controls the fuel to air ratio of said auxiliary fuel and air mixture supplied by said auxiliary fuel injection means.

* * * * *